(12) United States Patent
Shinohara

(10) Patent No.: US 8,861,003 B2
(45) Date of Patent: Oct. 14, 2014

(54) IMAGE FORMING APPARATUS THAT PERFORMS RECTANGLE DRAWING PROCESSING

(71) Applicant: Yuki Shinohara, Osaka (JP)

(72) Inventor: Yuki Shinohara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 9 days.

(21) Appl. No.: 13/755,885

(22) Filed: Jan. 31, 2013

(65) Prior Publication Data

US 2013/0194605 A1 Aug. 1, 2013

(30) Foreign Application Priority Data

Jan. 31, 2012 (JP) ................................. 2012-018465
Jan. 31, 2013 (EP) ..................................... 13153387

(51) Int. Cl.
*G06F 15/00* (2006.01)
*G06K 15/02* (2006.01)

(52) U.S. Cl.
CPC .......... *G06K 15/1813* (2013.01); *G06K 15/186* (2013.01); *G06F 15/1852* (2013.01)
USPC .............. 358/1.15; 358/1.13; 347/14; 347/16

(58) Field of Classification Search
None
See application file for complete search history.

(56) References Cited

U.S. PATENT DOCUMENTS

2010/0165394 A1* 7/2010 Hyuga et al. .................. 358/1.15
2011/0164084 A1* 7/2011 Hatada et al. ................... 347/16
2012/0133695 A1* 5/2012 Hakamada ....................... 347/14

FOREIGN PATENT DOCUMENTS

JP 2005-078521 3/2005
JP 2008-217537 9/2008

* cited by examiner

*Primary Examiner* — Kimberly A Williams
*Assistant Examiner* — Helen Q Zong
(74) *Attorney, Agent, or Firm* — McDonnell Boehnen Hulbert & Berghoff LLP

(57) ABSTRACT

An image forming apparatus includes: a dot image forming unit executes one of: (i) a default mode of forming a dot image of an entire rectangle by placing an internal dot group corresponding to a fill of an inside a rectangle and a contour dot group corresponding to a contour of the rectangle based on a first dot placement rule and a second dot placement rule, respectively; or (ii) a change mode of forming the dot image of the rectangle by unifying dot placement rules into either of the two dot placement rules and placing the internal dot group and the contour dot group; and an image formation control unit causes, in the change mode, the dot image forming unit to unify the dot placement rules into either of the two dot placement rules and to place the internal dot group and the contour dot group.

19 Claims, 14 Drawing Sheets

IMAGE FORMING APPARATUS THAT PERFORMS RECTANGLE DRAWING PROCESSING

REFERENCE TO RELATED APPLICATIONS

This application is based upon and claims the benefit of priority from the corresponding Japanese Patent Application Nos.: 2012-018465, filed in the Japan Patent Office on Jan. 31, 2012, the entire contents of which are incorporated herein by reference.

BACKGROUND

1. Technical Field

The present disclosure relates to an image forming apparatus that performs rectangle drawing processing. In particular, the present disclosure relates to an image forming apparatus that performs drawing processing based on an instruction included in a page description language.

2. Description of the Related Art

A typical image forming apparatus such as a printer interprets printable data received from a host computer, generates a bitmap image formed of dots, and performs printing thereof.

In one example, if the printable data includes a rectangle drawing instruction, a bitmap image formed of dots is generated by replacing a contour of a rectangle placed in a user coordinate space and a fill of an inside portion of the rectangle with dots in a device coordinate space.

In some examples, a PCL XL, which is known as a page description language that forms the printable data is interpreted by an image forming apparatus. A printer driver corresponding to the PCL XL issues a Rectangle operator or a PaintPath operator when generating the printable data including the rectangle drawing instruction.

An interpreter corresponding to the PCL XL (hereinafter referred to as "PCL XL interpreter") executes "stroke" and "fill" operations for a current path regarding both thereof (the Rectangle operator and the PaintPath operator perform substantially the same processing because the Rectangle operator internally executes the PaintPath operator).

During the "stroke" operation, the contour is drawn on a path in accordance with the designation of PenSource (color of pen) and PenWidth (width of pen), while during the "fill" operation, the inside of the path is filled in accordance with the designation of BrushSource (color of brush).

In the PCL XL, the stroke and the fill operations are different in regard to their pixel placement (hereinafter referred to as "dot placement rule").

When the rectangle subjected to a drawing instruction in the PCL XL is converted into the bitmap image, the contour is drawn in accordance with the dot placement rule called "Grid Intersection" for the stroke operation, while the inside portion of the rectangle is filled in accordance with the dot placement rule called "Grid Centered" for the fill operation.

When operating using the "Grid Intersection" rule, corresponding dots are placed based on a relationship between a drawing range of the fill and grid points. In part (a) of FIG. 9, the drawing range is the rectangle having reference points of (1.8, 1.4) and (5.2, 3.7), and during the fill operation, a region within this rectangle is filled. For example, (2, 2) is a grid point included in the drawing range, and hence a dot is placed in (2, 2). Further, a grid square expressed by (1, 1)-(2, 2) includes the drawing range in an inside portion thereof, and hence a dot is placed in (1, 1) as an upper-left grid point of this grid square (see part (b) of FIG. 9).

When operating using the "Grid Centered" rule, corresponding dots are placed based on a relationship between a center point of the grid square and the drawing range of the fill. For example, in part (a) of FIG. 9, (2.5, 1.5) is included in a rectangular region and is also the center point of the grid square, and hence a dot is placed in (2, 1) (see part (c) of FIG. 9). Such a dot placement rule is applied to the drawing of a bar code using a Windows® application such as BarStar® as illustrated in FIG. 10.

In practice, the bar code generated by such an application is pasted on data within a business application, such as word-processing software (e.g. Wore) or spreadsheet software (e.g. Excel®), to thereby convert the bar code into a vector image before printing thereof.

The conversion into the vector image provides an advantage in that an image is less likely to deteriorate even if the image is enlarged or reduced by the application.

Depending on the kind of business application or setting conditions, the bar code varies from one that is pasted as a vector image having a standard metafile format, such as a Windows® metafile format, to one that is pasted as a vector image having an enhanced metafile format in the case of the spreadsheet software.

Then, when printing such a bar code, the business application instructs the printer driver about the drawing of the contour and the filling of the inside portion as separate drawing commands.

However, when the printer driver generates the printable data in a PCL XL format based on the above-mentioned instructions, the drawing instructions differ depending on a difference in image format of the pasted bar code.

Specifically, if the bar code pasted in the data of the business application is the enhanced metafile format, only the PaintPath operator is issued in order to draw the contour and to fill the inside portion. On the other hand, if the bar code pasted in the data of the business application has the standard metafile format, the Rectangle operator is issued in order to draw the contour, and the PaintPath operator is issued in order to fill the inside portion.

Accordingly, no problem occurs in the case of printing the bar code formed in the enhanced metafile format. However, in the case of printing the bar code formed in the standard metafile format, the intermediation of two operators is involved, which may inhibit the bar code from being correctly drawn under a predetermined condition.

Specifically, when the placement of dots relating to the conversion from the user coordinate space into the device coordinate space involves rotation of the user coordinate space, a dot image corresponding to the contour and a dot image corresponding to the fill of the inside portion may become inconsistent thereby creating a line-shaped blank having a predetermined width in the inside portion of the bar code.

For example, in a case where the user coordinate space defined as landscape is printed on portrait-oriented paper or other such case, the line-shaped blank may occur when the user coordinate space is rotated counterclockwise by 90 degrees.

FIG. 11 illustrates an example of the printable data relating to the drawing of the bar code. Specifically, FIG. 11 illustrates the printable data on a bar (standard metafile format) of the bar code pasted in the word-processing software.

FIG. 12 illustrates a drawing processing procedure for forming the dot image of the bar in the device coordinate space based on the printable data illustrated in FIG. 11. In this example, the drawing processing procedure does not involve the rotation of the user coordinate space.

The device coordinate space is assumed to have a rightward direction indicating a positive x-axis direction and a downward direction indicating a positive y-axis direction.

Both in the user coordinate space and the device coordinate space, the rightward direction indicates the positive x-axis direction and the downward direction indicates the positive y-axis direction in a case where the rotation is not performed.

When receiving the printable data described in the PCL XL illustrated in FIG. 11, the PCL XL interpreter interprets the printable data, and controls processing of parts (i) to (iv) of FIG. 12.

First, when "x2 y2 x2' y2' BoundingBox" is interpreted, the Rectangle operator sets a path of the rectangle having reference points of (x2, y2) and (x2', y2') in the user coordinate space (part (i) of FIG. 12).

Subsequently, drawing processing of filling this rectangular region with black is performed based on "0 BrushSource" (part (ii) of FIG. 12). Note that, "NullPen PenSource" inhibits the stroke from being performed.

The Grid Centered rule is applied to this drawing processing, with the result that, as illustrated in part (ii) of FIG. 12, corresponding dots "F" are placed in the device coordinate space.

Subsequently, when "x1 y1 x1' y1' LinePath" is interpreted, the PaintPath operator sets the path of the rectangular region having reference points of (x1,y1) and (x1',y1') in the user coordinate space (part (iii) of FIG. 12).

Then, processing of drawing the contour on the set path is performed based on "0 PenSource" (part (iv) of FIG. 12). Note that, "NullBrush BrushSource" inhibits the fill from being performed.

The Grid Intersection rule is applied to this drawing processing, with the result that, as illustrated in part (iv) of FIG. 12, corresponding dots "S" are placed in the device coordinate space.

In this manner, even when the rectangle forms the standard metafile format, thereby involving the intermediation of the two operators, if the rotation is not involved, the user coordinate space and the device coordinate space become consistent with the corresponding dots placed appropriately, and hence the rectangle can be drawn correctly.

FIG. 13 illustrates the drawing processing procedure for placing and forming the dot image of the rectangle in the device coordinate space based on the printable data illustrated in FIG. 11. In this drawing processing procedure, the user coordinate space is rotated counterclockwise by 90 degrees.

In this case, the Rectangle operator sets the path of the rectangle having reference points of (x2, y2) and (x2', y2') in the user coordinate space (part (i) of FIG. 13).

Subsequently, the drawing processing of filling this rectangular region with black is performed based on "0 BrushSource" (part (ii) of FIG. 13). The Grid Centered rule is applied to this drawing processing, and hence, as illustrated in part (ii) of FIG. 13, the dots "F" corresponding to the positions of (x,y)=(3,3), (4,3),(5,3),(6,3),(3,4),(4,4),(5,4), and (6,4) are placed in the device coordinate space.

Subsequently, the PaintPath operator sets the path of the rectangle having reference points of (x1,y1) and (x1',y1') in the user coordinate space (part (iii) of FIG. 13).

Subsequently, the processing of drawing the contour on the set path is performed based on "0 PenSource" (part (iv) of FIG. 13). The Grid Intersection rule is applied to this drawing processing, and hence, as illustrated in part (iv) of FIG. 13, the dots "S" corresponding to (x,y)=(3,3), (4,3), (5,3), (6,3), (7,3), (8,3), (3,4), (8,4), (3,5), (8,5), (3,6), (4,6), (5,6), (6,6), (7,6), and (8,6) are placed in the device coordinate space.

In other words, as a result, dots are not placed in (x,y)=(4, 5), (5,5), (6,5), and (7,5) corresponding to the inside portion of the rectangle, which causes a one-dot-line blank.

Specifically, such a one-dot-line blank occurs when all the following conditions are satisfied: a drawing such that one rectangular image is formed of the stroke of the contour and the fill of the inside portion thereof; the width (PenWidth) of the contour of the rectangle is set to zero; and the image having the standard metafile format is used as the printable data.

FIG. 14 illustrates the line-shaped blank occurring when the thus-created bar code is printed.

As illustrated in FIG. 14, when the bar code has the standard metafile format described in the PCL XL and is printed with an orientation thereof changed due to the rotation of the user coordinate space, the line-shaped blank having a one-dot width occurs.

Therefore, when such a bar code is read, false recognition of data, an error in reading, or the like may occur.

SUMMARY

An image forming apparatus according to an embodiment of the present disclosure includes a dot image forming unit and an image formation control unit. The dot image forming unit is configured to selectively execute one of: (i) a default mode of forming, if printable data described in a specific page description language includes a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space. The image formation control unit is configured to cause, while the change mode is selected, the dot image forming unit to unify the dot placement rules into either the first dot placement rule or the second dot placement rule and to place the internal dot group and the contour dot group in the coordinate space.

A non-transitory computer-readable recording medium according to an embodiment of the present disclosure stores an image forming program to be executed on a computer of an image forming apparatus. A first program code included in the image forming program causes the computer to selectively execute one of: (i) a default mode of forming, if printable data described in a specific page description language includes a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space. A second program code included in the image forming program causes the computer to unify, while the change mode is selected, the dot placement rules into either the first dot placement rule or the second dot placement rule and to place the internal dot group and the contour dot group in the coordinate space.

An image forming method according to an embodiment of the present disclosure includes: selectively executing, by a dot image forming unit, one of: (i) a default mode of forming, if printable data described in a specific page description language includes a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space. Further, the image forming method includes causing, by an image formation control unit, while the change mode is selected, the dot image forming unit to unify the dot placement rules into either the first dot placement rule or the second dot placement rule and to place the internal dot group and the contour dot group in the coordinate space.

Additional features and advantages are described herein, and will be apparent from the following detailed description and the figures.

DETAILED DESCRIPTION

Printing System

The present disclosure can be applied to a printing system including an image forming apparatus and a host computer that are communicably connected to each other via a network such as a LAN.

Figure 1:
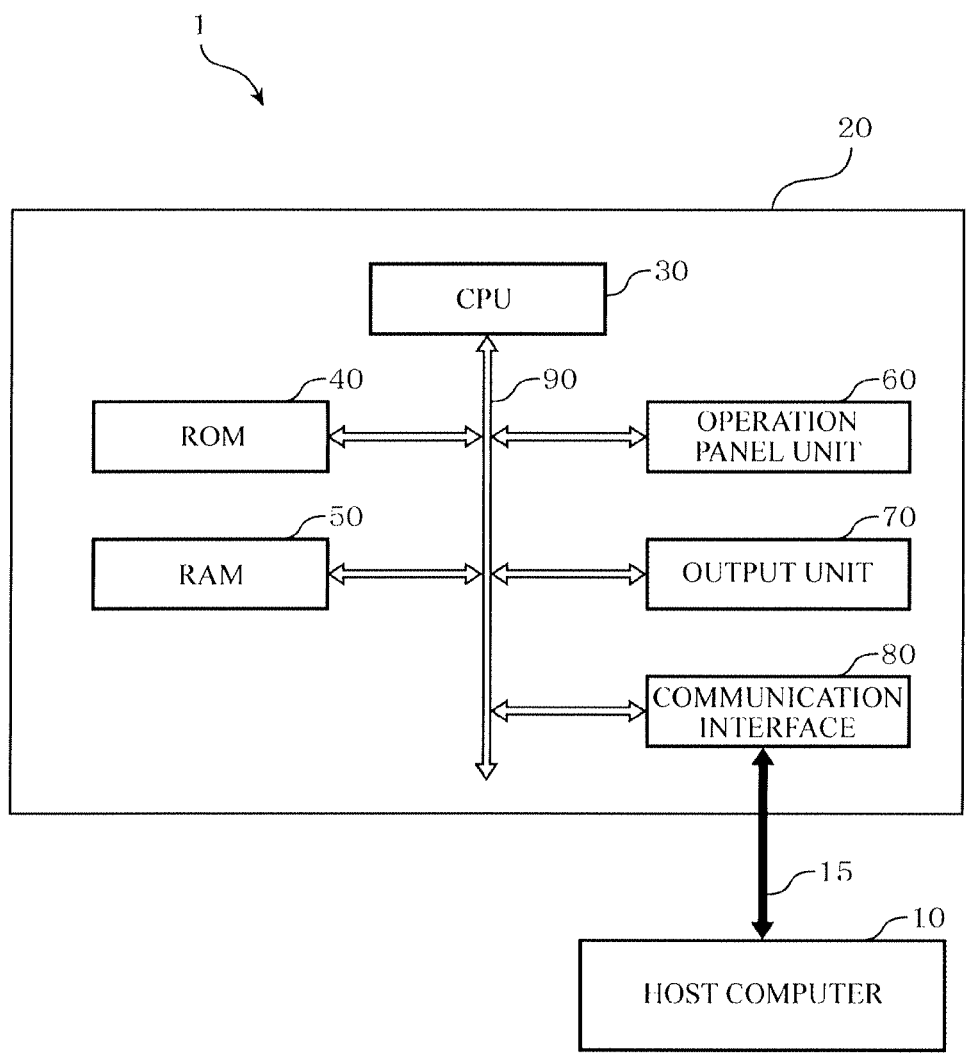
FIG. 1 illustrates a hardware configuration of a printing system according to an embodiment of the present disclosure.

FIG. 1 illustrates a hardware configuration of a printing system according to an embodiment of the present disclosure.

In printing system 1, image forming apparatus 20 is a printer apparatus having a function of printing printable data supplied from host computer 10. Image forming apparatus 20 includes computer (central processing unit (CPU)) 30 that performs control of the entire apparatus and various kinds of arithmetic operation processing; read only memory (ROM) 40 for storing a program and data; random access memory (RAM) 50 for temporarily storing the program and the data as a work area; operation panel unit (operation unit) 60 that is formed of a front panel of an apparatus main body or the like and used to display various kinds of information and to input various directives; output unit 70 that prints various kinds of data on a recording medium such as paper by using an image formation process such as an electrophotographic process; and communication interface 80 such as a LAN card for connection to network 15, all of which are connected to one another via bus 90.

Image Forming Apparatus

Figure 2:
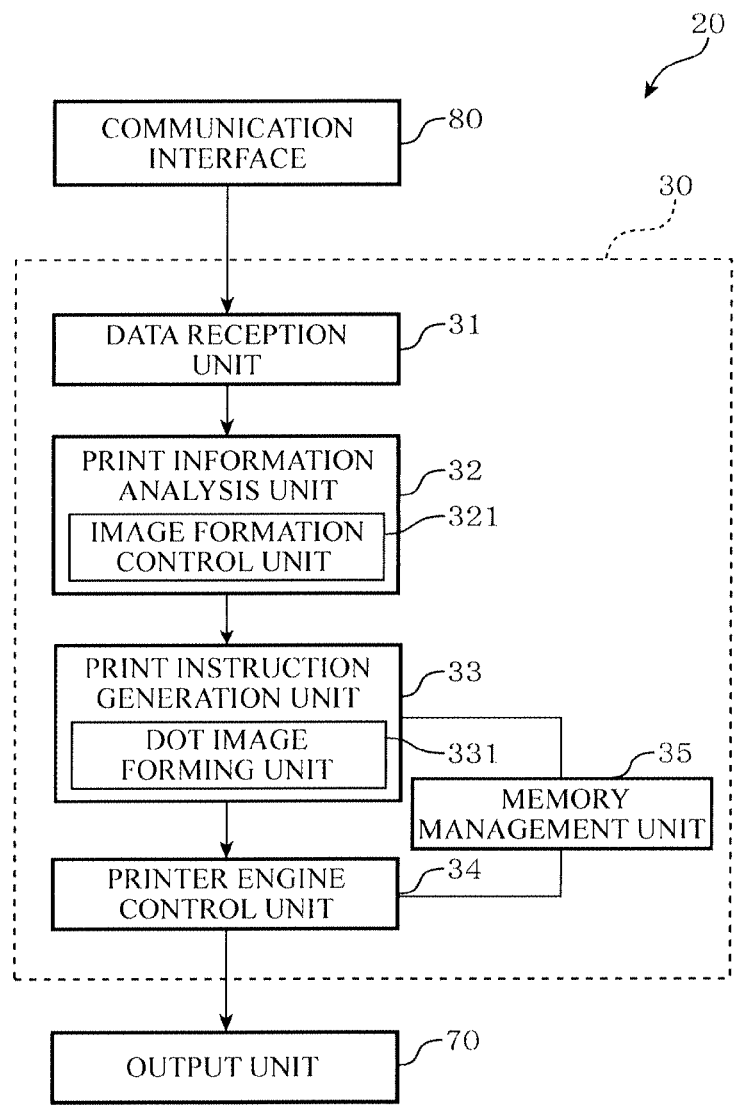
FIG. 2 illustrates a configuration of an image forming apparatus according to an embodiment of the present disclosure.

FIG. 2 illustrates a configuration of an image forming apparatus according to an embodiment of the present disclosure.

As illustrated in FIG. 2, image forming apparatus 20 includes data reception unit 31 that receives the printable data via communication interface 80; print information analysis unit 32 that analyzes the printable data received by data reception unit 31 and issues various instructions to print instruction generation unit 33; print instruction generation unit 33 that rasterizes intermediate data and converts the intermediate data into a bitmap image; memory management unit 35 that manages RAM 50 that temporarily stores the bitmap image; and printer engine control unit 34 that performs output control, all of which are mounted as processing functions implemented by CPU 30. Output unit 70 performs printing on the recording medium based on the bitmap image.

Next, a description is made of drawing processing unique to the printer apparatus according to this embodiment.

As illustrated in FIG. 2, print instruction generation unit 33 includes dot image forming unit 331.

If the printable data described in a specific page description language includes a rectangle drawing instruction, dot image forming unit 331 forms a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule.

Specifically, if the printable data described in a PCL XL includes the rectangle drawing instruction, dot image forming unit 331 performs processing of drawing a rectangular image after an internal processing of replacing the contour of the rectangle placed in a user coordinate space and the fill of the inside portion of the rectangle by dots in a device coordinate space so as to place the dots therein.

In conformity with an original drawing rule defined in the PCL XL, the dot image of the entire rectangle is formed by placing the internal dot group corresponding to the fill of the inside portion of the rectangle in the device coordinate space based on the "Grid Centered" rule (first dot placement rule) and placing the contour dot group corresponding to the contour of the rectangle in the device coordinate space based on the "Grid Intersection" rule (second dot placement rule). In accordance with a specific instruction, without conforming to the original drawing rule, dot image forming unit 331 unifies dot placement rules into either the Grid Centered rule or the Grid Intersection rule to form the dot image of the entire rectangle by placing the internal dot group and the contour dot group in the coordinate space.

The user coordinate space represents a coordinate space set on the printable data. In a case where the user coordinate space defined as landscape is printed on portrait-oriented paper or other such case, in order to form the dot image in accordance with the device coordinate space, the dot image forming unit 331 rotates user coordinates counterclockwise by 90 degrees and moves the user coordinates in parallel.

The device coordinate space represents a coordinate space that expresses positions of dots that can be reproduced, and differs depending on output performance, such as an output resolution, of the printer apparatus. In this embodiment, the device coordinate space represents a coordinate space expressed by reference lines having predetermined intervals and grid squares formed by those reference lines intersecting at right angles. The dots of the bitmap image are placed in grid points in which the reference lines intersect each other in the device coordinate space.

The "Grid Centered" rule (first dot placement rule) represents a rule that defines: the grid square whose center point is included in a rectangular region is identified and a predetermined grid point among grid points existing on the identified grid square is set as a dot placement target.

In this case, the grid point to be the dot placement target in the "Grid Centered" rule can be obtained by performing a specific calculation method for an arbitrary point within the rectangular region. More specifically, when values of coordinates of the grid point are positive integers, if given coordinates within the rectangular region includes the center point of the grid square, the grid point indicated by the values obtained by rounding down or rounding up decimal fractions of the x-value and the y-value of the coordinates can be set as the dot placement target.

The values may be defined as one of: (a) the values obtained by rounding down the decimal fractions of both the x-value and the y-value of the coordinates; (b) the values obtained by rounding up the decimal fractions of both the x-value and the y-value of the coordinates; (c) the values obtained by rounding down the decimal fraction of the x-value of the coordinates and rounding up the decimal fraction of the y-value; or (d) the values obtained by rounding up the decimal fraction of the x-value of the coordinates and rounding down the decimal fraction of the y-value.

In the PCL XL, the dot placement target is set as the grid point corresponding to the values defined by (a). If the given coordinates within the rectangular region do not include the center point of the grid square, the grid point to be the dot placement target is not calculated.

For example, if a pair of coordinates within the rectangular region correspond to the center point of the grid square, the grid point indicated by the values obtained by rounding down the decimal fractions of both the x-value and the y-value of the coordinates may be set as the dot placement target. Specifically, if coordinates (1.5, 1.5) are located within the rectangular region, coordinates (1, 1) obtained by rounding down the decimal fractions are set as the dot placement target. According to such a calculation method, the predetermined grid point to be the dot placement target is uniquely determined as an upper-left point of the identified grid square.

The "Grid Intersection" rule (second dot placement rule) represents a rule that defines: the grid points included in the rectangular region among the grid points in the coordinate space, and the predetermined grid points among the grid points existing on the grid squares including the rectangular region in an inside portion thereof are identified, and the identified grid points are set as the dot placement targets.

In this case, the grid point to be the dot placement target in the "Grid Intersection" rule can be obtained by performing a specific calculation method for an arbitrary point within the rectangular region. More specifically, when values of coordinates of the grid point are positive integers, the grid point indicated by the values obtained by rounding down or rounding up decimal fractions of the x-value and the y-value of the coordinates within the rectangular region can be set as the dot placement target.

Similar to the "Grid Centered" rule, the values may be defined as one of: (a) the values obtained by rounding down the decimal fractions of both the x-value and the y-value of the coordinates; (b) the values obtained by rounding up the decimal fractions of both the x-value and the y-value of the coordinates; (c) the values obtained by rounding down the decimal fraction of the x-value of the coordinates and rounding up the decimal fraction of the y-value; or (d) the values obtained by rounding up the decimal fraction of the x-value of the coordinates and rounding down the decimal fraction of the y-value.

In the PCL XL, the dot placement target is set as the grid point corresponding to the values defined by (a).

For example, the grid point indicated by the values obtained by rounding down the decimal fractions of both the x-value and the y-value of the coordinates within the rectangular region may be set as the dot placement target. Specifically, when focusing on coordinates (x,y)=(1.6,1.7), coordinates (1,1) obtained by rounding down the decimal fractions are set as the dot placement target. Further, when focusing on coordinates (x,y)=(3.1,2.4), (6,6), or (5.2,3.7), coordinates (3,2), (6,6), or (5,3) obtained by rounding down the decimal fractions are set as the dot placement target. According to such a calculation method, the grid point to be the dot placement target is determined as the grid point included in the rectangular region among the grid points in the coordinate space and the predetermined grid point among the grid points existing on the grid square including the rectangular region in the inside portion thereof. Note that, the predetermined grid point is uniquely determined as the upper-left point of the grid square including the rectangular region in the inside portion thereof.

Print information analysis unit 32 is a so-called PCL XL interpreter that interprets the PCL XL, and includes an image formation control unit 321 for performing corresponding image formation control when the PCL XL includes the rectangle drawing instruction.

Image formation control unit 321 performs control that causes dot image forming unit 331 to unify the dot placement rules into either "Grid Intersection" or "Grid Centered" and to place the contour dot group and the internal dot group in the device coordinate space.

To perform the control that unifies the dot placement rules, two modes may be used: a mode of causing dot image forming unit 331 to unify the dot placement rules into the Grid Intersection rule and perform the drawing processing (Model) and a mode of causing dot image forming unit 331 to unify the dot placement rules into the Grid Centered rule and perform the drawing processing (Mode 2).

The particular mode for controlling the dot image forming unit is selected by, for example, displaying a menu for a "vector drawing mode" that enables the selection of an arbitrary control mode on operation panel unit 60 such as a front panel.

Figure 3:
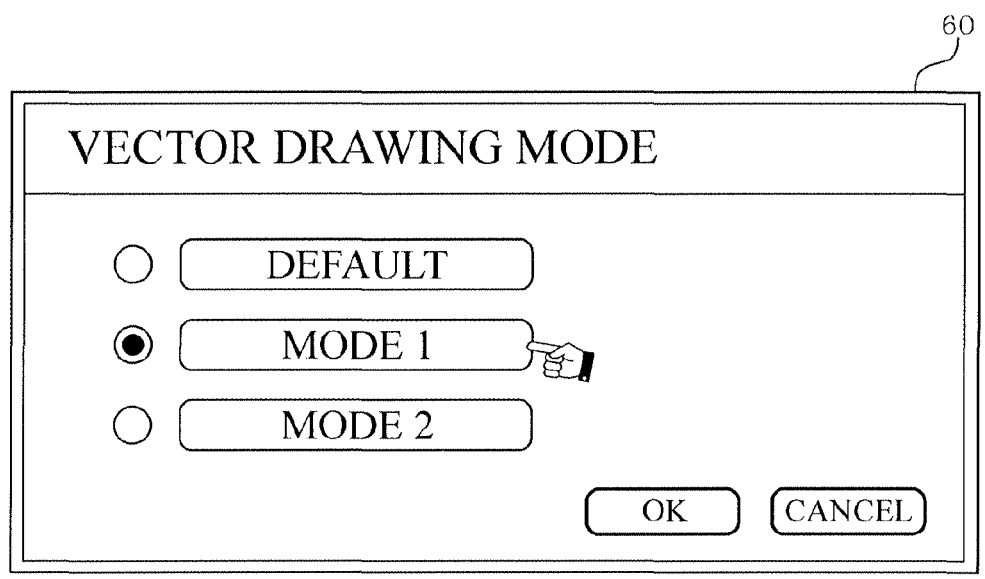
FIG. 3 illustrates a mode selection screen displayed on an operation panel unit of the image forming apparatus illustrated in FIG. 2.

FIG. 3 illustrates a mode selection screen displayed on an operation panel unit.

When the user selects the arbitrary mode displayed on a panel, an operation signal relating to a mode selection is input through operation panel unit 60. When a CPU detects this operation signal, the drawing processing is executed based on the corresponding control mode.

Next, a description is made of the drawing processing of each of the modes.

Figure 12:
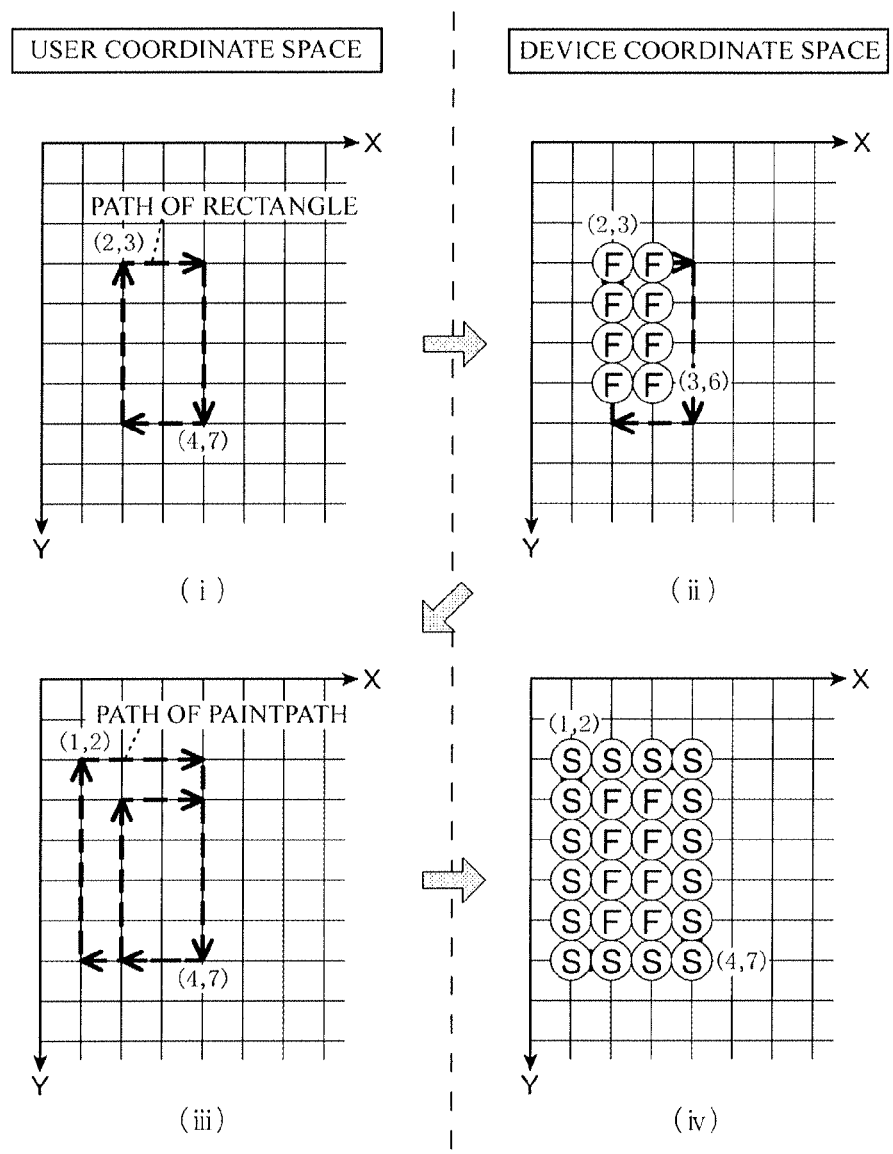
FIG. 12 illustrates a drawing processing procedure according to the related art.
Figure 13:
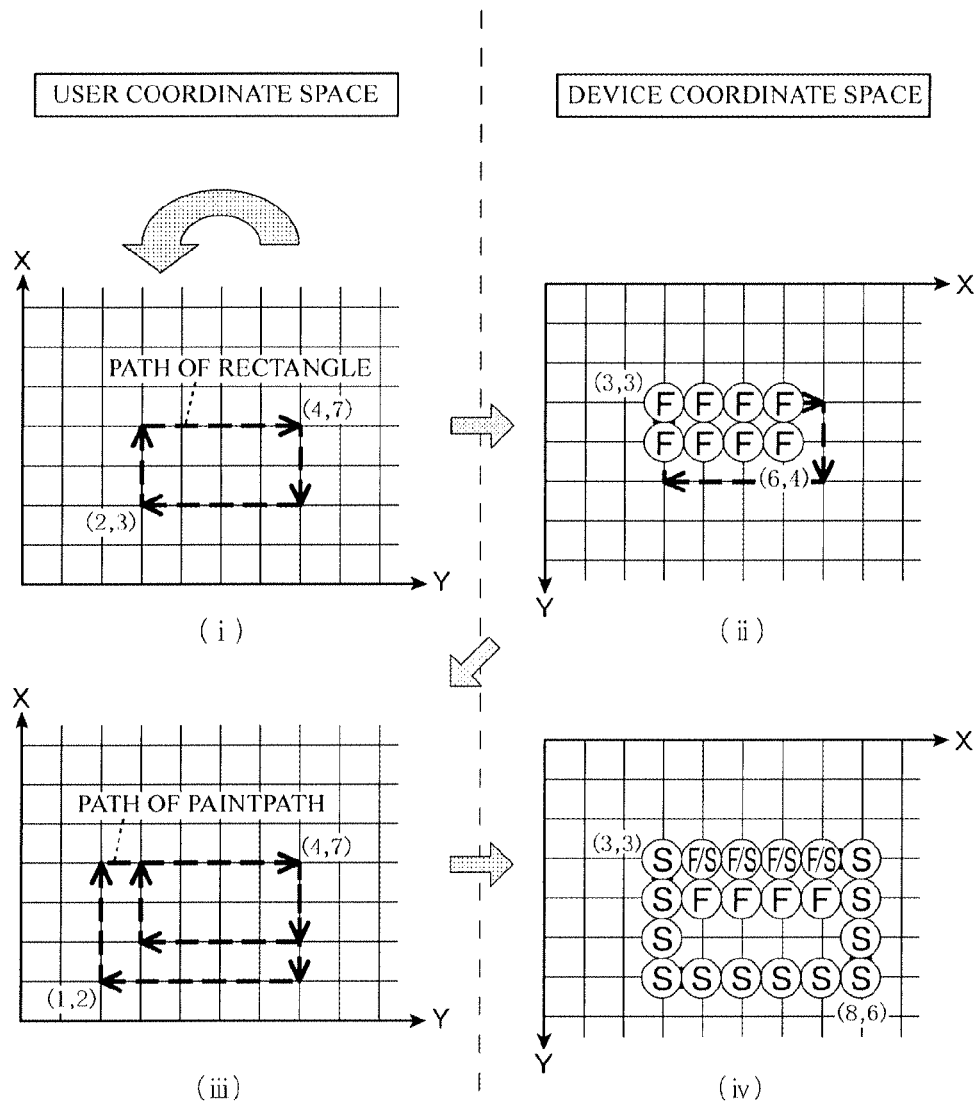
FIG. 13 illustrates a drawing processing procedure according to the related art.
Figure 14:
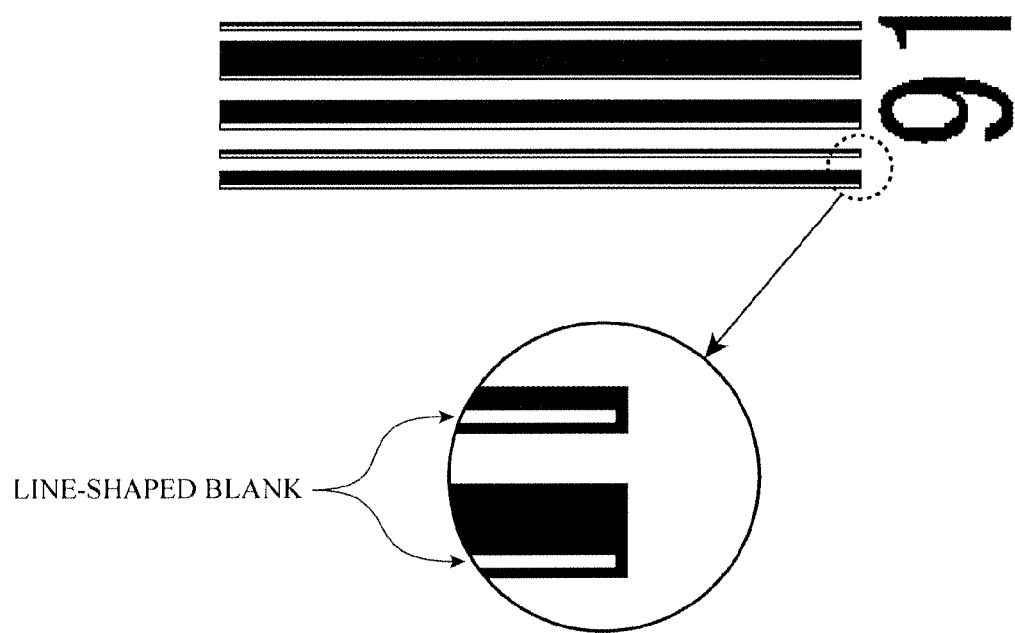
FIG. 14 illustrates a line-shaped blank that may occur in a bar of the bar code.

Note that, "default" illustrated in FIG. 3 is a mode representing "as in specifications of the PCL XL," and a default mode is selected in a normal state. Specifically, while the default mode is selected, as illustrated in FIG. 12 and FIG. 13, the filling of the inside portion is performed based on the Grid Centered rule, while the drawing of the contour is performed based on the Grid Intersection rule.

"Mode 1" and "Mode 2" illustrated in FIG. 3 represent change modes. The drawing processing performed when Mode 1 or Mode 2 is selected is described below.

Mode 1

Mode 1 is a control mode for unifying both of the dot placement rules used in the drawing of the dot image (contour dot group) corresponding to the contour of the rectangle and the dot image (internal dot group) corresponding to the fill of the inside portion into the "Grid Intersection" rule.

Specifically, an image formation control unit instructs a dot image forming unit to place dots by changing the "Grid Centered" rule originally applied when the contour dot group is placed in the device coordinate space to the "Grid Intersection" rule. In accordance with the instruction issued by the image formation control unit, the dot image forming unit forms the dot image by placing the contour dot group based on the "Grid Intersection" rule.

Note that, the Grid Intersection rule originally applied when the internal dot group is placed is applied as described above without a change.

Figure 4:
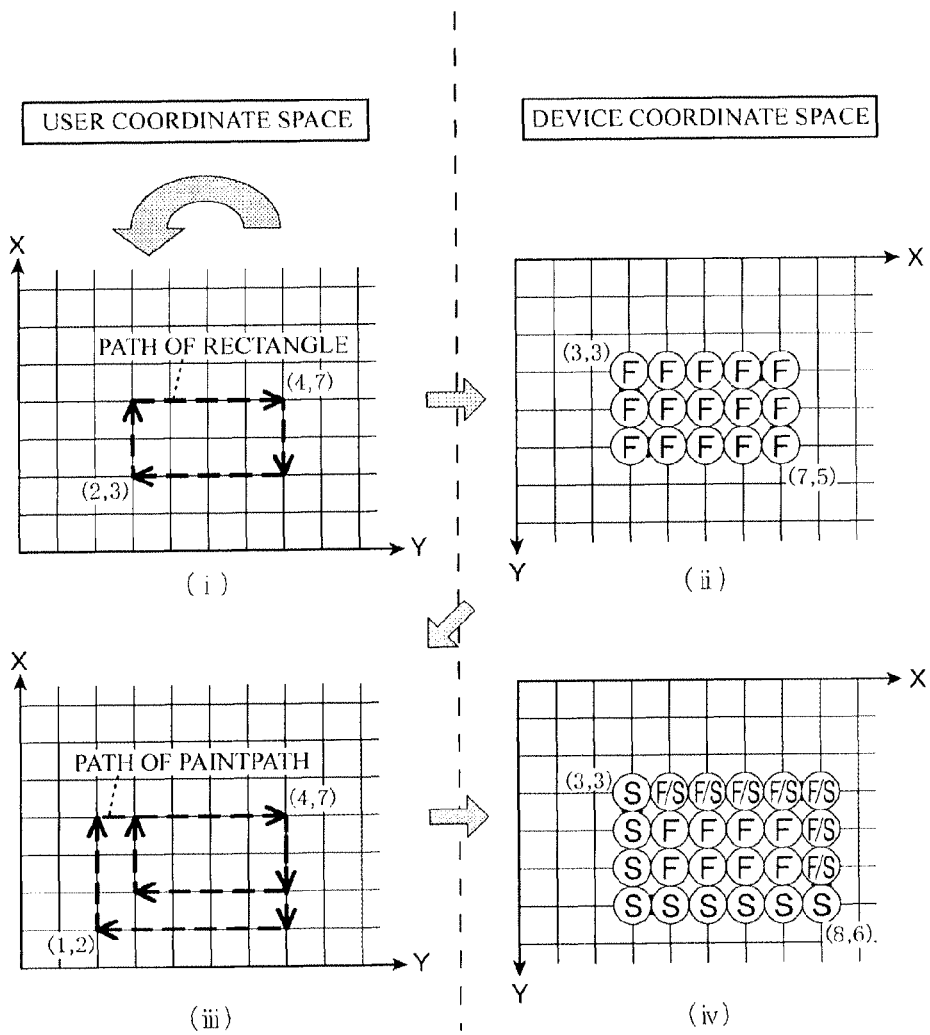
FIG. 4 illustrates a drawing processing procedure of Mode 1 performed when a rectangle is to be drawn by being rotated.

FIG. 4 illustrates a drawing processing procedure of Mode 1 performed when the rectangle is to be drawn by being rotated.

The rectangle is assumed to have a standard metafile format described in the PCL XL. In this case, the user coordinate space is rotated counterclockwise by 90 degrees, and therefore has an upward direction indicating a positive x-axis direction and a rightward direction indicating a positive y-axis direction.

When receiving an instruction to perform the drawing processing in Mode 1, the dot image forming unit forms the dot image of the rectangle in accordance with the drawing processing procedure illustrated in FIG. 4.

First, the path of the rectangle having reference points of (x2,y2) and (x2',y2') is set based on the Rectangle operator (part (i) of FIG. 4). Note that, it is assumed that (x2,y2)=(2,3) and (x2',y2')=(4,7).

Subsequently, the drawing processing of filling a specific region in the device coordinate space, which corresponds to the rectangular region in the user coordinate space, with black is performed based on "0 BrushSource" (part (ii) of FIG. 4).

The "Grid Intersection" rule is applied to this drawing processing, in which the grid point included in the rectangular region and a predetermined (upper left in this embodiment) grid point among the grid points existing on the grid square including a drawing range in an inside portion thereof are identified. Specifically, respective grid points indicated by (3, 3) to (7, 5) in the device coordinate space, which corresponds to (2, 3) to (4, 7) in the user coordinate space, are identified to be set as the dot placement targets. In this case, the drawing processing of the filling is performed, and hence dots are placed in all the grid points indicated by (3, 3) to (7, 5) in the device coordinate space.

Accordingly, as illustrated in part (ii) of FIG. 4, corresponding dots "F" (internal dot group) are placed in the positions of (x,y)=(3,3), (4,3), (5,3), (6,3), (7,3), (3,4), (4,4), (5,4), (6,4), (7,4), (3,5), (4,5), (5,5), (6,5), and (7,5) in the device coordinate space.

Subsequently, the path of the rectangle having reference points of (x1,y1) and (x1',y1') is set based on the PaintPath operator (part (iii) of FIG. 4). Note that, it is assumed that (x1,y1)=(1,2) and (x1',y1')=(4,7).

Then, the processing of drawing the contour on the set path is performed based on "0 PenSource" (part (iv) of FIG. 4).

The "Grid Intersection" rule is applied to this drawing processing, in which the grid point included in the rectangular region and the predetermined (upper left in this embodiment) grid point among the grid points existing on the grid square including the drawing range in an inside portion thereof are identified. Specifically, respective grid points indicated by (3, 3) to (8, 6) in the device coordinate space, which corresponds to (1, 2) to (4, 7) in the user coordinate space, are identified to be set as the dot placement targets. In this case, the processing of drawing the contour is performed, and hence dots are placed in grid points forming a contour of a rectangle constituted by the grid points indicated by (3, 3) to (8, 6) in the device coordinate space.

Accordingly, as illustrated in part (iv) of FIG. 4, corresponding dots "S" (contour dot group) are placed in the positions of (x,y)=(3,3), (4,3), (5,3), (6,3), (7,3), (8,3), (3,4), (8,4), (3,5), (8,5), (3,6), (4,6), (5,6), (6,6), (7,6), and (8,6) in the device coordinate space.

Note that, a dot "F/S" represents an overlap in placement between the dot "F" and the dot "S".

In this manner, in Mode 1, the dot placement rules applied in the drawing of the contour and the inside portion to be filled are unified into the "Grid Intersection".

Therefore, even when the rectangle (such as bar code pasted in data for word-processing software) having the standard metafile format described in the PCL XL is rotated to be printed, the drawing can be performed successfully without causing a conventional line-shaped blank in the inside portion (part (iv) of FIG. 4).

Note that, in Mode 1, it is possible to appropriately form the dot image of the rectangle even when the rotation of the rectangle is not involved.

Figure 5:
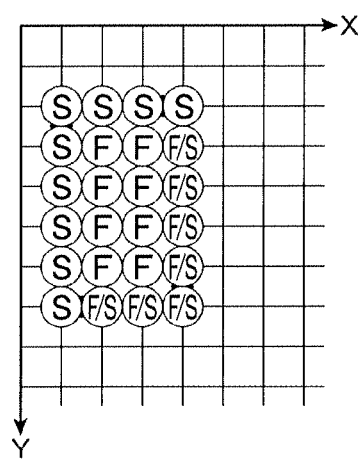
FIG. 5 illustrates an example of a dot image of the rectangle that is formed as a result of the drawing processing procedure of Mode 1 and that does not involve rotation.
Figure 11:
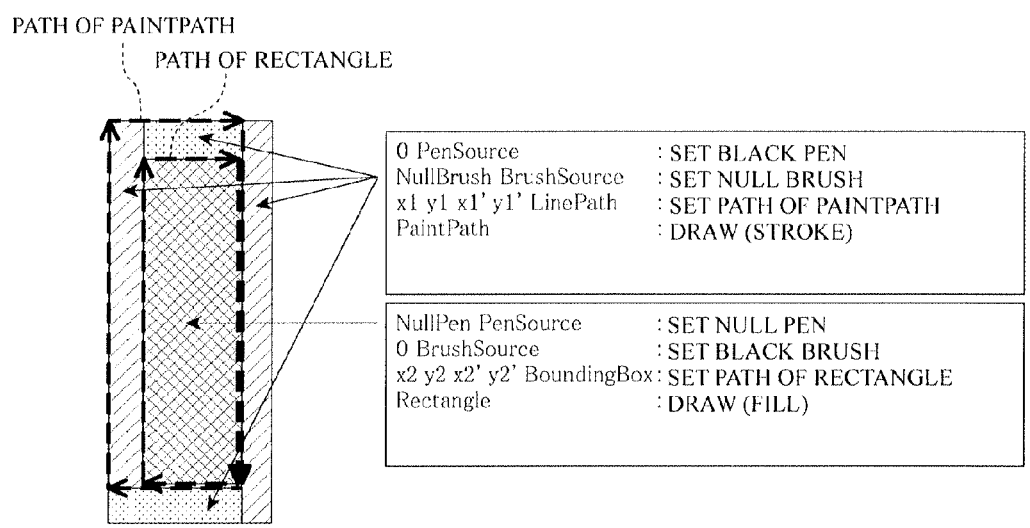
FIG. 11 illustrates an example of printable data relating to drawing of the bar code.

FIG. 5 illustrates an example of the dot image of the rectangle that is formed in the drawing processing of Mode 1 and that does not involve the rotation. More specifically, FIG. 5 illustrates the dot image obtained when the rectangle is drawn based on the printable data illustrated in FIG. 11 in Mode 1, and illustrates the rectangular image when the rotation is not involved.

As illustrated in FIG. 5, the rectangular image can be formed without causing the line-shaped blank even when the rotation is not involved.

Mode 2

Next, a description is made of the drawing processing of Mode 2.

Mode 2 is a control mode for unifying both the dot placement rules used in the drawing of the contour dot group and the internal dot group into the "Grid Centered".

Specifically, an image formation control unit instructs a dot image forming unit to place dots by changing the "Grid Intersection" rule originally applied when the internal dot group is placed in the device coordinate space to the "Grid Centered" rule. In accordance with the instruction issued by the image formation control unit, the dot image forming unit forms the dot image by placing the internal dot group based on the "Grid Centered" rule.

Note that, the Grid Centered rule originally applied when the contour dot group is placed is applied without a change.

Figure 6:
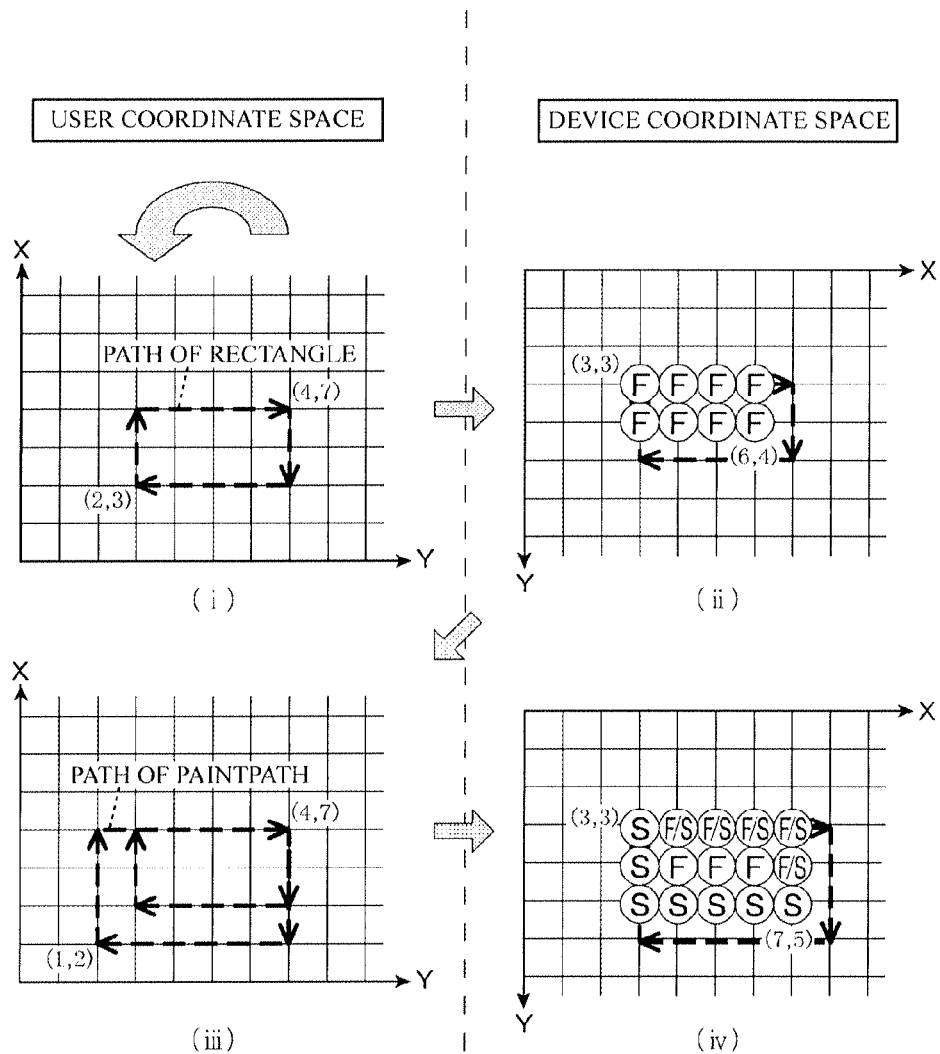
FIG. 6 illustrates a drawing processing procedure of Mode 2 performed when the rectangle is to be drawn by being rotated.

FIG. 6 illustrates a drawing processing procedure of Mode 2 performed when the rectangle is to be drawn by being rotated.

The rectangle is assumed to have a standard metafile format described in the PCL XL. In this case, the user coordinate space is rotated counterclockwise by 90 degrees, and therefore has an upward direction indicating a positive x-axis direction and a rightward direction indicating a positive y-axis direction.

When receiving an instruction to perform the drawing processing in Mode 2, the dot image forming unit forms the dot image of the rectangle in accordance with the drawing processing procedure illustrated in FIG. 6.

First, the path of the rectangle having reference points of (x2, y2) and (x2', y2') is set based on the Rectangle operator (part (i) of FIG. 6). Note that, it is assumed that (x2,y2)=(2,3) and (x2',y2')=(4,7).

Subsequently, the drawing processing of filling a specific region in the device coordinate space, which corresponds to the rectangular region in the user coordinate space, with black is performed based on "0 BrushSource" (part (ii) of FIG. 6).

The "Grid Centered" rule is applied to this drawing processing, and the grid square whose center point is included in the rectangular region is identified. Specifically, the grid squares expressed by (3, 4)-(4, 5), (3, 3)-(4, 4), (4, 4)-(5, 5), (4, 3)-(5, 4), (5, 4)-(6, 5), (5, 3)-(6, 4), (6, 4)-(7, 5), and (6, 3)-(7, 4) in the device coordinate space, which correspond to (2, 3)-(3, 4), (3, 3)-(4, 4), (2, 4)-(3, 5), (3, 4)-(4, 5), (2, 5)-(3, 6), (3, 5)-(4, 6), (2, 6)-(3, 7), and (3, 6)-(4, 7) in the user coordinate space, are identified, and predetermined (upper left in this embodiment) grid points among the grid points existing on the respective grid squares are set as the dot placement targets.

In this case, the drawing processing of the filling is performed, and hence for all the identified grid squares, the dots are placed in the predetermined (upper left in this embodiment) grid points among the grid points existing on the respective grid squares.

Accordingly, as illustrated in part (ii) of FIG. 6, corresponding dots "F" (internal dot group) are placed in the positions of (x,y)=(3,3), (4,3), (5,3), (6,3), (3,4), (4,4), (5,4), and (6,4) in the device coordinate space.

Subsequently, the path of the rectangle having reference points of (x1,y1) and (x1',y1') is set based on the PaintPath operator (part (iii) of FIG. 6).

Then, the processing of drawing the contour on the set path is performed based on "0 PenSource" (part (iv) of FIG. 6).

The "Grid Centered" rule is applied to this drawing processing, and the grid square whose center point is included in the rectangular region is identified. Specifically, the grid squares expressed by (3,5)-(4,6), (3,4)-(4,5), (3,3)-(4,4), (4,5)-(5,6), (4,4)-(5,5), (4,3)-(5,4), (5,5)-(6,6), (5,4)-(6,5), (5,3)-(6,4), (6,5)-(7,6), (6,4)-(7,5), (6,3)-(7,4), (7,5)-(8,6), (7,4)-(8,5), and (7,3)-(8,4) in the device coordinate space, which correspond to (1,2)-(2,3), (2,2)-(3,3), (3,2)-(4,3), (1,3)-(2,4), (2,3)-(3,4), (3,3)-(4,4), (1,4)-(2,5), (2,4)-(3,5), (3,4)-(4,5), (1,5)-(2,6), (2,5)-(3,6), (3,5)-(4,6), (1,6)-(2,7), (2,6)-(3,7), and (3,6)-(4,7) in the user coordinate space, are identified, and predetermined (upper left in this embodiment) grid points among the grid points existing on the respective grid squares are set as the dot placement targets.

In this case, the processing of drawing the contour is performed, and hence dots are placed in the predetermined (upper left in this embodiment) grid points among the grid points existing on the grid squares expressed by (3,5)-(4,6), (3,4)-(4,5), (3,3)-(4,4), (4,5)-(5,6), (4,3)-(5,4), (5,5)-(6,6), (5,3)-(6,4), (6,5)-(7,6), (6,3)-(7,4), (7,5)-(8,6), (7,4)-(8,5), and (7,3)-(8,4) in the device coordinate space in internal contact with the path among the identified grid squares.

Accordingly, as illustrated in part (iv) of FIG. 6, corresponding dots "S" (contour dot group) are placed in the positions of (x,y)=(3,5), (3,4), (3,3), (4,5), (4,3), (5,5), (5,3), (6,5), (6,3), (7,5), (7,4), and (7,3).

Note that, a dot "F/S" represents an overlap in placement between the dot "F" and the dot "S".

In this manner, in Mode 2, the dot placement rules applied in the drawing of the contour and the inside portion to be filled are unified into the "Grid Centered".

Therefore, also in Mode 2, even when the rectangle (such as bar code pasted in data for word-processing software) having the standard metafile format described in the PCL XL is rotated to be printed, the drawing can be performed successfully without causing a conventional line-shaped blank in the inside portion (part (iv) of FIG. 6).

The rectangle has a size of (width×height) being 6×4 dots in the default mode and Mode 1, while being 5×3 dots in Mode 2, and hence a one-dot difference occurs in the width/height.

Figure 7:
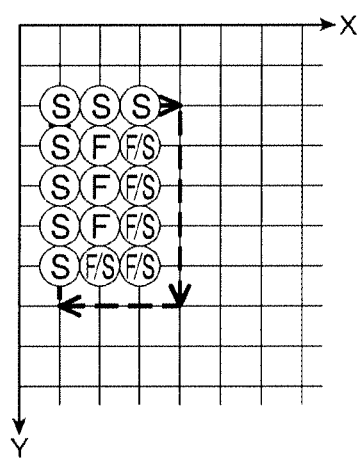
FIG. 7 illustrates an example of a dot image of the rectangle that is formed as a result of the drawing processing procedure of Mode 2 and that does not involve rotation.

FIG. 7 illustrates an example of the dot image of the rectangle that is formed in the drawing processing of Mode 2 and that does not involve the rotation. More specifically, FIG. 7 illustrates the dot image obtained when the rectangle is drawn based on the printable data illustrated in FIG. 11 in Mode 2, and illustrates the rectangular image when the rotation is not involved.

As illustrated in FIG. 7, the rectangular image can be formed without causing the blank in the inside portion of the rectangle even when the rotation of the rectangle is not involved.

In this case, a one-dot difference occurs in the width and the height of the rectangle.

Note that, the selection of the control mode is not only performed through an operation panel unit but may also be performed on a host computer side by using both the printer apparatus and a printer driver.

Figure 8:
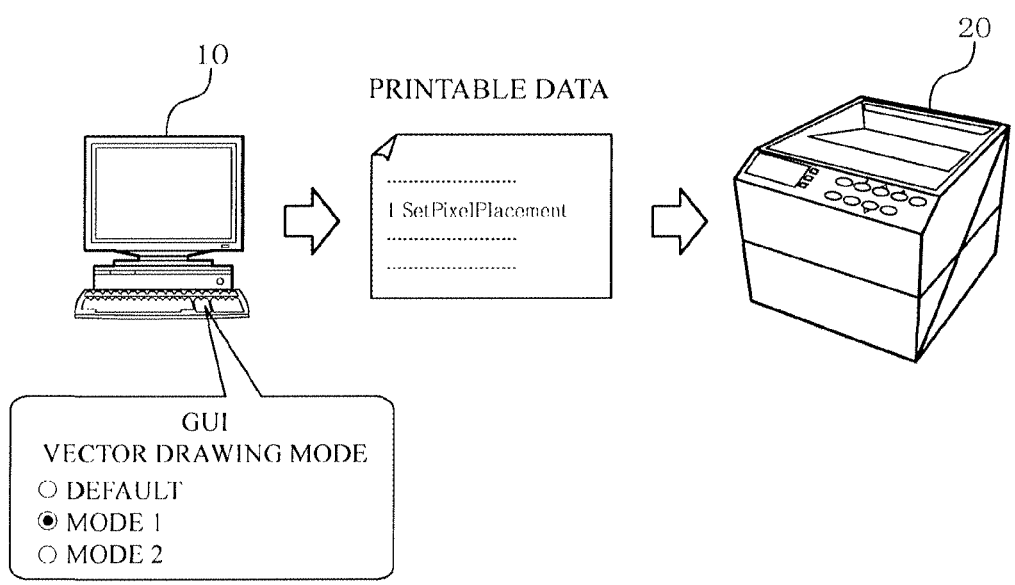
FIG. 8 illustrates a procedure that allows a host computer to select a control mode.
Figure 9:
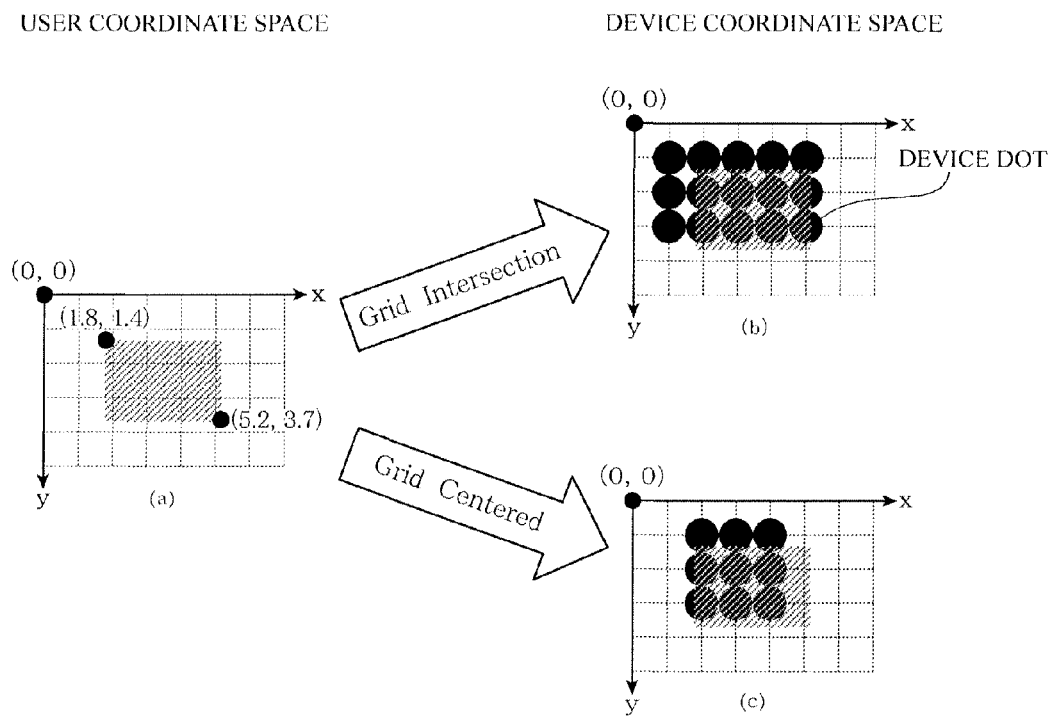
FIG. 9 illustrates pixel placement in a PCL XL.
Figure 10:
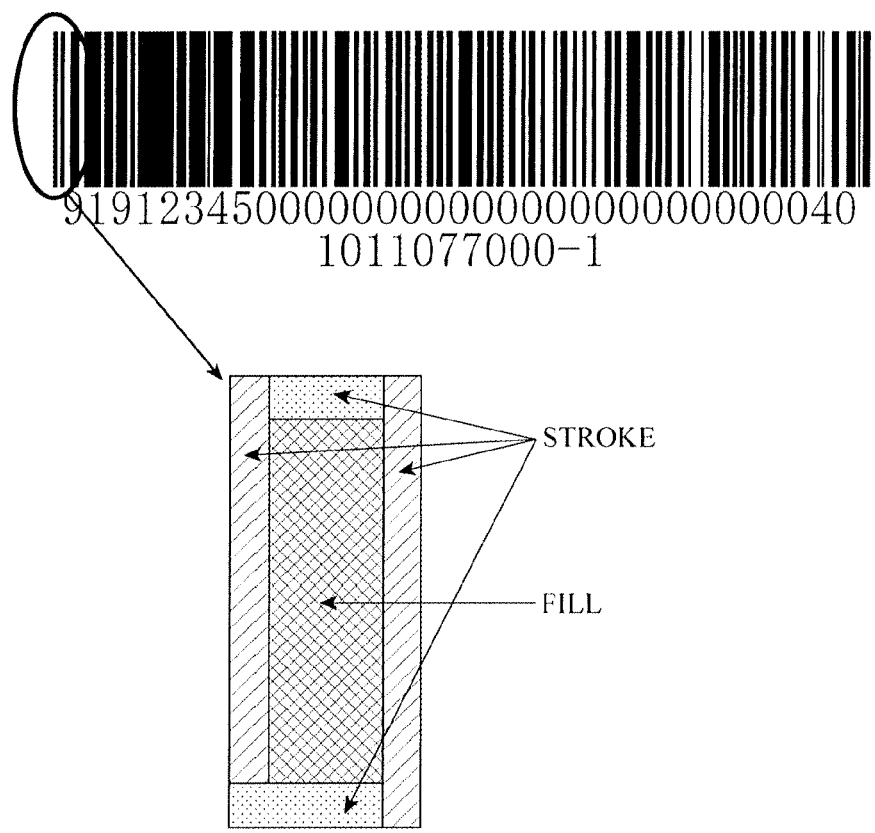
FIG. 10 illustrates drawing processing for a bar code.

FIG. 8 illustrates a procedure that allows the host computer to select the control mode. In this case, the selection of the control mode is performed on host computer 10 by using both image forming apparatus 20 and the printer driver.

In this case, on image forming apparatus 20, the PCL XL interpreter (print information analysis unit) implements an original PCL XL operator so as to be able to change the dot placement rules. For example, an operator named "SetPixelPlacement" may be implemented, and arguments of the operator may be set as follows:

0: As in the specifications of the PCL XL.
1: The dot placement rules for the contour and the fill of the inside portion is set to the Grid Intersection.
2: The dot placement rules for the contour and the fill of the inside portion are set to the Grid Centered.

The printer driver is provided with the menu for the "vector drawing mode" on a graphical user interface (GUI).

Then, this vector drawing mode is provided with three modes as follows.

Default: Nothing is performed in particular.
Mode 1: "1 SetPixelPlacement" is issued to the printable data.
Mode 2: "2 SetPixelPlacement" is issued to the printable data.

If the printable data includes a "SetPixelPlacement" operator, the PCL XL interpreter can perform the drawing processing based on the mode for the setting.

For example, as illustrated in FIG. 8, the PCL XL interpreter can interpret "1 SetPixelPlacement" from the printable data and change the PixelPlacement to 1 (Mode 1) to perform the drawing processing.

Note that, here, the example of implementing the original PCL XL operator in the case of the mode change is described, but a language that allows the setting to be changed on the printer apparatus, such as a PJL command or a PRE-SCRIBE® command, may suffice.

Further, the selection of the control mode can also be automatically performed by the image forming apparatus. In this case, if the printable data includes the rectangle drawing instruction, the print information analysis unit of the image forming apparatus determines if there is a match between the orientations of the user coordinate space of the printable data and the device coordinate space of the paper to be subjected to the printing. If there is a match as a result of the determination—in other words, if the rotation of the rectangle is not involved—the image formation control unit instructs a print instruction generation unit to perform the drawing processing in the default mode.

If there is no match—in other words, if the rotation of the rectangle is involved—the print information analysis unit analyzes the printable data and determines if a line-shaped blank occurs when the drawing processing is performed by rotating the rectangle. More specifically, first, the image formation control unit causes the dot image forming unit to rotate the rectangle included in the printable data and to place the dot image of the rectangle in the device coordinate space in the default mode. Subsequently, the print information analysis unit determines if the line-shaped blank has occurred in the formed dot image of the rectangle. If the blank has occurred as a result of the determination, the image formation control unit instructs the print instruction generation unit to perform the drawing processing in the change mode.

To determine which one of Mode 1 and Mode 2 the image formation control unit selects depends on an initial setting input by the user. Specifically, Mode 1 is automatically selected if the initial setting is Mode 1, and Mode 2 is automatically selected if the initial setting is Mode 2.

If the blank has not occurred, the image formation control unit instructs the print instruction generation unit to perform the drawing processing in the default mode. In this case, the already-formed dot image of the rectangle can be used in the drawing processing for the printable data.

Image Forming Program

Next, an image forming program is described.

An image formation control function, a dot image forming function, and the like of a computer (image forming apparatus) according to the embodiment are realized by the image forming program stored in the storage unit (such as ROM or hard disk drive).

The image forming program is read by a control unit (such as CPU) of the computer, to thereby send a directive to each component of the computer and to perform the drawing processing based on the above-mentioned Mode 1 and Mode 2.

Thus, the respective functions are realized by the image forming program being software cooperating with the respective components of the computer (image forming apparatus) being hardware resources.

Note that, the image forming program may not only be stored in the ROM, the hard disk drive, or the like of the computer, but can also be stored in a computer-readable recording medium such as an external storage device or a portable recording medium.

The external storage device represents an additional memory device that incorporates a recording medium such as a compact disc-read only memory (CD-ROM) that is externally connected to the image forming apparatus. On the other hand, the portable recording medium may be a recording medium that can be mounted to a recording medium drive (driving device) and that can be carried around, a flexible disc, a memory card, and a magneto-optical disk.

The program recorded in the recording medium is, for example, loaded into a RAM of the computer and executed by the CPU. This execution realizes the respective functions according to the above-mentioned embodiment.

In addition, when the image forming program is to be loaded on the computer, the program of those kind retained in another computer can also be downloaded into the self-owned RAM or external storage device by using a communication line. The thus-downloaded program can also realize the respective functions according to the above-mentioned embodiment by being executed by the CPU.

As described above, according to the image forming apparatus and the image forming program of this embodiment, the dot placement rules are unified if the printable data described in the PCL XL includes the rectangle drawing instruction having the standard metafile format.

Therefore, even when the printing is performed by rotating the rectangle, the rectangle can be appropriately drawn and printed without causing the blank in the inside portion.

Accordingly, the bar code generated in this manner does not cause an error in reading, false recognition, or the like, and can provide the printing system with high reliability.

Further, it is possible to provide the user with means for changing the dot placement rule in the PCL XL.

For example, if a one-dot-line blank occurs in the inside portion of the rectangle on a printed matter, the user can select an arbitrary control mode to thereby obtain printing results desired by the user.

Therefore, it is possible to realize the printing system that is convenient for the user.

The present disclosure is not limited to the above-mentioned embodiment, and various modifications can naturally be made within the scope of the present disclosure.

For example, four sides of the rectangular region are not necessarily placed along the reference points within the coordinate space. Also in that case, in the same manner as the embodiment, the grid point to be the dot placement target can be obtained.

Further, when the drawing is performed by rotating the rectangle, "default" may be excluded from selection options displayed on the mode selection screen illustrated in FIG. 3.

The present disclosure can be used for the image forming apparatus such as the printer apparatus.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   a dot image forming unit configured to selectively execute one of:
   (i) a default mode of forming, if printable data described in a specific page description language includes a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space; and an image formation control unit configured to cause, while the change mode is selected, the dot image forming unit to unify the dot placement rules into either the first dot placement rule or the second dot placement rule and to place the internal dot group and the contour dot group in the coordinate space, wherein the coordinate space includes a coordinate space defined by reference lines having predetermined intervals and a plurality of grid squares formed by those reference lines intersecting at right angles, wherein the first dot placement rule includes a rule indicating that at least one grid square whose center point is included in a drawing range is identified from the plurality of grid squares and a dot is placed in a predetermined grid point among grid points existing on the identified at least one grid square, wherein the second dot placement rule includes a rule indicating that at least one grid point included in the drawing range among a plurality of grid points in the coordinate space and the predetermined grid point among the grid points existing on the grid square including the drawing range in an inside portion thereof are identified and dots are placed in the identified grid points, wherein the change mode includes a Mode 1 and a Mode 2, wherein the Mode 1 comprises unifying the dot placement rules into the first dot placement rule and placing the internal dot group and the contour dot group in the coordinate space, wherein the Mode 2 comprises unifying the dot placement rules into the second dot placement rule and placing the internal dot group and the contour dot group in the coordinate space, and wherein the image formation control unit is configured to select the Mode 1 or the Mode 2 in the change mode.

2. The image forming apparatus according to claim 1, wherein when the specific page description language is set as a PCL XL, the dot image forming unit is configured to place the internal dot group and the contour dot group in the coordinate space with Grid Centered rule applied as the first dot placement rule and Grid Intersection rule applied as the second dot placement rule; and the image formation control unit is configured to cause, while the change mode is selected, the dot image forming unit to unify the dot placement rules into either the Grid Centered rule or the Grid Intersection rule and to place the internal dot group and the contour dot group in the coordinate space.

3. The image forming apparatus according to claim 1, wherein if the printable data includes the rectangle drawing instruction, the image formation control unit is configured to (i) determine if there is a match between orientations of a user coordinate space of the printable data and a device coordinate space of a paper to be subjected to printing, (ii) if there is the match, select the default mode, (iii) if there is no match, form the dot image of the entire rectangle in the device coordinate space in the default mode and determine if a line-shaped blank occurs in the inside portion of the formed dot image of the rectangle.

4. The image forming apparatus according to claim 3, wherein the image formation control unit is further configured to select the change mode if it is determined that the line-shaped blank occurs.

5. The image forming apparatus according to claim 3, wherein if it is determined that the line-shaped blank does not occur, the image formation control unit is further configured to select the default mode and use the formed dot image of the rectangle in the drawing processing.

6. The image forming apparatus according to claim 1, wherein the image formation control unit is further configured to set, while the change mode is selected, the change mode automatically to the Mode 1 unless there is an input signal indicating that the Mode 2 is to be selected.

7. The image forming apparatus according to claim 1, further comprising an operation unit configured to receive an input of an operation signal relating to a mode selection.

8. The image forming apparatus according to claim 7, wherein the image formation control unit is further configured to cause the dot image forming unit to place the internal dot group and the contour dot group in the coordinate space in response to the input of the operation signal.

9. The image forming apparatus according to claim 1, wherein the image formation control unit causes the dot image forming unit to place the internal dot group and the contour dot group in the coordinate space in response to an input signal relating to a mode selection included in the printable data.

10. A non-transitory computer-readable recording medium having stored thereon an image forming program to be executed in a computer of an image forming apparatus, the image forming program comprising:

a first program code that causes the computer to selectively execute one of:

(i) a default mode of forming, if printable data described in a specific page description language includes a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space; and a second program code that causes the computer to unify, while the change mode is selected, the dot placement rules into either the first dot placement rule or the second dot placement rule and to place the internal dot group and the contour dot group in the coordinate space, wherein the coordinate space includes a coordinate space defined by reference lines having predetermined intervals and a plurality of grid squares formed by those reference lines intersecting at right angles, wherein the first dot placement rule includes a rule indicating that at least one grid square whose center point is included in a drawing range is identified from the plurality of grid squares and a dot is placed in a predetermined grid point among grid points existing on the identified at least one grid square, wherein the second dot placement rule includes a rule indicating that at least one grid point included in the drawing range among a plurality of grid points in the coordinate space and the predetermined grid point among the grid points existing on the grid square including the drawing range in an inside portion thereof are identified and dots are placed in the identified grid points, wherein the change mode includes a Mode 1 and a Mode 2, wherein the Mode 1 comprises unifying the dot placement rules into the first dot placement rule and placing the internal dot group and the contour dot group in the coordinate space, wherein the Mode 2 comprises unifying the dot placement rules into the second dot placement rule and placing the internal dot group and the contour dot group in the coordinate space, and wherein the second program code further causes the computer to select the Mode 1 or the Mode 2 in the change mode.

11. The non-transitory computer-readable recording medium according to claim 10, wherein when the specific page description language is set as a PCL XL, the first program code causes the computer to place the internal dot group and the contour dot group in the coordinate space with Grid Centered rule applied as the first dot placement rule and Grid Intersection rule applied as the second dot placement rule; and the second program code causes the computer to unify, while the change mode is selected, the dot placement rules into either the Grid Centered rule or the Grid Intersection rule and to place the internal dot group and the contour dot group in the coordinate space.

12. The non-transitory computer-readable recording medium according to claim 10, wherein if the printable data includes the rectangle drawing instruction, the second program code causes the computer to (i) determine if there is a match between orientations of a user coordinate space of the printable data and a device coordinate space of a paper to be subjected to printing, (ii) if there is the match, select the default mode, (iii) if there is no match, form the dot image of the entire rectangle in the device coordinate space in the default mode and determine if a line-shaped blank occurs in the inside portion the formed dot image of the rectangle.

13. The non-transitory computer-readable recording medium according to claim 12, wherein the second program code further causes the computer to select the change mode if it is determined that the line-shaped blank occurs, and wherein if it is determined that the line-shaped blank does not occur, the second program code further causes the computer to select the default mode and use the formed dot image of the rectangle in the drawing processing.

14. The non-transitory computer-readable recording medium according to claim 10, wherein the second program code causes the computer to set, while the change mode is selected, the change mode automatically to the Mode 1 unless there is an input signal indicating that the Mode 2 is to be selected.

15. An image forming method, comprising:
selectively executing, via a dot image forming unit, one of:
(i) a default mode of forming, if printable data described in a specific page description language include a rectangle drawing instruction, a dot image of an entire rectangle by placing an internal dot group corresponding to a fill of an inside portion of a rectangle in a coordinate space based on a first dot placement rule and placing a contour dot group corresponding to a contour of the rectangle in the coordinate space based on a second dot placement rule; or (ii) a change mode of forming the dot image of the entire rectangle by unifying dot placement rules into either the first dot placement rule or the second dot placement rule and placing the internal dot group and the contour dot group in the coordinate space; and causing, via an image formation control unit, while the change mode is selected, the dot image forming unit to unify the dot placement rules into either the first dot placement rule or the second dot placement rule and to place the internal dot group and the contour dot group in the coordinate space, wherein the coordinate space includes a coordinate space defined by reference lines having predetermined intervals and a plurality of grid squares formed by those reference lines intersecting at right angles, wherein the first dot placement rule includes a rule indicating that at least one grid square whose center point is included in a drawing range is identified from the plurality of grid squares and a dot is placed in a predetermined grid point among grid points existing on the identified at least one grid square, wherein the second dot placement rule includes a rule indicating that at least one grid point included in the drawing range among a plurality of grid points in the coordinate space and the predetermined grid point among the grid points existing on the grid square including the drawing range in an inside portion thereof are identified and dots are placed in the identified grid points, wherein the change mode includes a Mode 1 and a Mode 2, wherein the Mode 1 comprises unifying the dot placement rules into the first dot placement rule and placing the internal dot group and the contour dot group in the coordinate space, wherein the Mode 2 comprises unifying the dot placement rules into the second dot placement rule and placing the internal dot group and the contour dot group in the coordinate space, and wherein the image formation control unit selects the Mode 1 or the Mode 2 in the change mode.

16. The image forming method according to claim 15, wherein when the specific page description language is set as a PCL XL, the dot image forming unit places the internal dot group and the contour dot group in the coordinate space with Grid Centered rule applied as the first dot placement rule and Grid Intersection rule applied as the second dot placement rule, and the image formation control unit causes, while the change mode is selected, the dot image forming unit to unify the dot placement rules into either the Grid Centered rule or the Grid Intersection rule and to place the internal dot group and the contour dot group in the coordinate space.

17. The image forming method according to claim 15, wherein if the printable data includes the rectangle drawing instruction, the image formation control unit (i) determines if there is a match between orientations of a user coordinate space of the printable data and a device coordinate space of a paper to be subjected to printing, (ii) if there is the match, selects the default mode, (iii) if there is no match, forms the dot image of the entire rectangle in the device coordinate space in the default mode and determines if a line-shaped blank occurs in the inside portion of the formed dot image of the rectangle.

18. The image forming method according to claim 17, wherein the image formation control unit selects the change mode if it is determined that the line-shaped blank occurs, and wherein if it is determined that the line-shaped blank does not occur, the image formation control unit selects the default mode and uses the formed dot image of the rectangle in the drawing processing.

19. The image forming method according to claim 15, wherein the image formation control unit sets, while the change mode is selected, the change mode automatically to the Mode 1 unless there is an input signal indicating that the Mode 2 is to be selected.

* * * * *